US008640226B2

(12) United States Patent
Chaturvedi et al.

(10) Patent No.: US 8,640,226 B2
(45) Date of Patent: Jan. 28, 2014

(54) MECHANISMS TO SECURE DATA ON HARD RESET OF DEVICE

(75) Inventors: Pradeep Kumar Chaturvedi, Bangalore (IN); Prasanta Kumar Sahoo, Bangalore (IN)

(73) Assignee: Novell, Inc., Provo, UT (US)

( * ) Notice: Subject to any disclaimer, the term of this patent is extended or adjusted under 35 U.S.C. 154(b) by 1227 days.

(21) Appl. No.: 12/147,737

(22) Filed: Jun. 27, 2008

(65) Prior Publication Data
US 2009/0328131 A1 Dec. 31, 2009

(51) Int. Cl.
G06F 12/16 (2006.01)

(52) U.S. Cl.
USPC ........... 726/19; 726/1; 726/17; 726/34; 713/1

(58) Field of Classification Search
USPC .................................. 726/17, 19, 34; 713/1
See application file for complete search history.

(56) References Cited

U.S. PATENT DOCUMENTS

| 6,378,068 | B1 * | 4/2002 | Foster et al. ...................... 713/1 |
| 7,315,905 | B2 | 1/2008 | Das et al. |
| 7,340,593 | B2 | 3/2008 | Martin |
| 7,428,633 | B2 * | 9/2008 | Park et al. ........................ 713/1 |
| 7,603,435 | B2 * | 10/2009 | Welingkar et al. ............. 709/217 |
| 7,729,690 | B1 * | 6/2010 | Huang et al. ................... 455/419 |
| 7,743,241 | B1 * | 6/2010 | Moore .............................. 713/2 |
| 7,971,229 | B1 * | 6/2011 | Chatterji et al. .................. 726/1 |
| 8,495,700 | B2 * | 7/2013 | Shahbazi .......................... 726/1 |
| 2004/0235523 | A1 * | 11/2004 | Schrire et al. .................. 455/558 |
| 2005/0216762 | A1 * | 9/2005 | Peikari ........................... 713/200 |
| 2006/0224742 | A1 * | 10/2006 | Shahbazi ....................... 709/226 |
| 2006/0288252 | A1 | 12/2006 | Kim |
| 2007/0169084 | A1 * | 7/2007 | Frank et al. .................... 717/168 |
| 2007/0198997 | A1 * | 8/2007 | Jacops et al. .................. 719/328 |
| 2007/0250920 | A1 * | 10/2007 | Lindsay .............................. 726/7 |
| 2008/0014914 | A1 * | 1/2008 | Kim et al. ...................... 455/419 |
| 2008/0115226 | A1 * | 5/2008 | Welingkar et al. .............. 726/28 |
| 2008/0140959 | A1 * | 6/2008 | Popell et al. ................... 711/161 |
| 2009/0150970 | A1 * | 6/2009 | Hinds et al. ....................... 726/1 |
| 2009/0307333 | A1 * | 12/2009 | Welingkar et al. ............ 709/219 |

OTHER PUBLICATIONS

"Application to handle Hard-Reset & Soft-Reset Interrupt" forum posts from PocketPC Junkies, Dec. 26, 2007-Jan. 2, 2008 (2 pages) http://www.pocketpcjunkies.com/Uwe/Forum.aspx/wince-dev/4486/Application-to-handle-Hard-Reset-Soft-Reset-Interrupt.*
Nat Frampton. "Interrupt Architecture in Microsoft Windows CE .NET" Article from Jul. 2002 (11 pages) http://msdn.microsoft.com/en-us/library/ms836807.aspx.*
Kelly Clay. "Reset a BlackBerry to Factory Defaults" Published Jun. 29, 2007 (3 pages) http://www.lockergnome.com/it/2007/06/29/reset-a-blackberry-to-factory-defaults/.*

(Continued)

Primary Examiner — Darren B Schwartz
Assistant Examiner — Thomas Gyorfi
(74) Attorney, Agent, or Firm — Schwegman Lundberg & Woessner, P.A.

(57) ABSTRACT

Mechanisms to secure data on a hard reset of a device are provided. A hard reset request is detected on a handheld device. Before the hard reset is permitted to process an additional security compliance check is made. Assuming, the additional security compliance check is successful and before the hard reset is processed, the data of the handheld device is backed up to a configurable location.

20 Claims, 3 Drawing Sheets

(56) References Cited

OTHER PUBLICATIONS

"Perform a Reset for a BlackBerry Curve 8310" Publication date of Jun. 28, 2007 on Google (4 pages) http://www.wireless.att.com/support_static_files/KB/KB84976.html.*

"Master reset a BlackBerry device?" PPublication date of Nov. 4, 2005 on Google (1 page) http://answers.yahoo.com/question/index?qid=1006042410315.*

"Tips for Formatting Nokia 6600,6681 etc"—All About Symbian Forums. Posted Aug. 18, 2006 (2 pages) http://www.allaboutsymbian.com/forum/showthread.php?t=49971.*

"How to Format a Nokia 6680 Device" from wikiHow (Article dated Mar. 18, 2008 by Google) (2 pages) http://www.wikihow.com/Format--a-Nokia-6680-Device.*

"Authentication Reset Component (ARC)", http://msdn.microsoft.com/en-us/library/bb416398.aspx, Windows Embedded Developer Center, (Mar. 25, 2008), 1 pg.

* cited by examiner

MECHANISMS TO SECURE DATA ON HARD RESET OF DEVICE

BACKGROUND

Increasingly, individuals for business and personal reasons are relying on handheld computing devices, such as smart phones with computing and/or data networking capabilities, personal digital assistants (PDA's), etc. With this increased usage comes an increased risk associated with losing vital data that has not yet synchronized to a more permanent device or media.

Handheld devices include a variety of operating systems (OS's), one such OS is Windows CE®. Windows CE® can be problematic for a variety of reasons. For example, handheld devices running Windows CE® can be manually reset via a hard reset; a hard reset erases user application data; so, a device owner loses all data previously saved on the device during a hard reset.

Furthermore, conventional hard resets for handheld devices do not require any user authorization to be processed. So, a user can inadvertently issue a hard reset on his/her device or a malicious user that gains momentary access to an authorized user's device can perform a hard reset. It may even be that a child of the user or someone that is authorized to use the device inadvertently performs a hard reset on the device. In some situations, it may be that the device acquires a virus via a network connection or via something loaded on the device and it is the virus that performs the hard reset.

What ever the reason, once a hard reset is processed the legitimate user can lose vital data that has not yet been synchronized off the handheld device. This can be devastating to the user as well as any enterprise that employs the user. So, not only do inadvertent hard resets require no authorization to be processed, the hard resets have catastrophic consequences on the users and enterprises of the users because of the loss of data that occurs with hard reset operations.

Therefore, what is needed is a more secure mechanism for authorizing and performing hard resets of handheld devices.

SUMMARY

In various embodiments, mechanisms to secure data on hard resets of devices are provided. More specifically, and in an embodiment, a method is provided for authorizing a hard reset and securing data hard on a device during a hard reset operation.

DETAILED DESCRIPTION

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "handheld device" is a particular type of device that is portable and often carried by an individual. Some example handheld devices include, but are not limited to, PDA's, phones, household appliances, gaming devices, etc.

A "hard reset" is an operation supported by an OS of the handheld device that erases the user's application data and settings. This can be viewed as a reformat disk command that is often performed on computers. All manufacturers of handheld devices and OS's include a hard reset operation that essentially erases all user data from those devices. As used herein the "hard reset" is handled by a custom hard reset application that is registered with a kernel of an OS for a handheld device.

Various embodiments of this invention can be implemented in existing OS's and handheld devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

Figure 1:
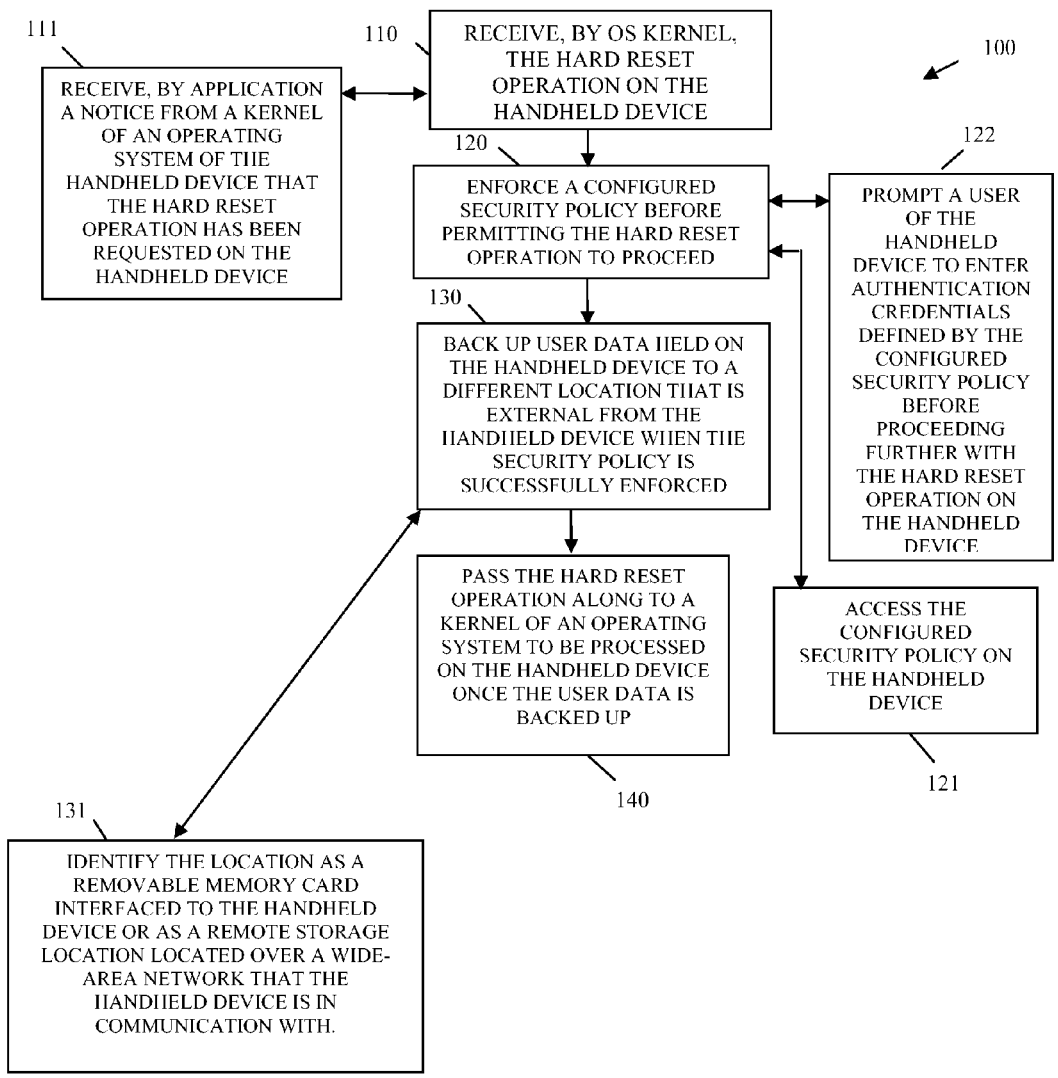
FIG. 1 is a diagram of a method for authorizing a hard reset and securing data hard on a device during a hard reset operation, according to an example embodiment.

FIG. 1 is a diagram of a method 100 for authorizing a hard reset and securing data hard on a device during a hard reset operation, according to an example embodiment. The method 100 (hereinafter "hard reset service") is implemented as instructions in a machine-accessible and readable medium. The instructions when executed by a handheld machine (processor and memory enabled device, such as a phone, PDA, gaming device, etc.) perform the processing depicted in the FIG. 1. The hard reset service is also operational over and processes within a network. The network may be wired, wireless, or a combination of wired and wireless. The hard reset service is a customized hard reset application that is registered with a kernel of the handheld device's OS to handle hard resets in the customized manners discussed herein and below. Thus, the hard reset service is to be viewed as a custom hard reset application or service.

As will be more fully described herein and below, the hard reset service ensures that any hard reset processed on a handheld device undergoes additional security compliance checking before being permitted to proceed on the handheld device. Moreover, once compliance is assured vital data stored on the handheld device is backed up to a portable media (such as removable memory card) or to an administrator-defined remote network location before the hard reset is processed.

At 110, the hard reset service (via an Operating System (OS) Kernel) receives a hard reset operation on a handheld device. The hard reset service processes on a handheld device and receives notification of a hard reset operation. This notification or detection can occur in a variety of manners.

For example, at 111, the hard reset service (via an application) receives a notification from a kernel process that executes within an operation system of the handheld device. The kernel process instructs the hard reset service that the hard reset operation has been requested on the handheld device. A specific example implementation as to how this occurs is described in greater detail herein and below.

At 120, the hard reset service enforces a configured security policy before permitting the hard reset operation to proceed. In a conventional approach, there is not additional security compliance that occurs; rather, when a hard reset operation is issued, the operating system executes the hard reset and user data associated with the handheld device is erased in the process. This occurs conventionally even when the hard reset operation was inadvertently requested or maliciously requested. Such a situation does not occur with the hard reset service when it is processing on a handheld device, because the hard reset service permits a pre-configured security policy to be enforced before the hard reset is actually processed by the operating system of the handheld device. Again, example scenarios associated with implementing the security policy check are described in greater detail herein and below.

In an embodiment, at 121, the hard reset service accesses the configured security policy on the handheld device.

According to an embodiment, at 122, the hard reset service initiates security policy enforcement that causes a prompt to be presented to a user. So, the hard reset service prompts the user to enter authentication credentials, which are defined by the configured security policy, before the hard reset operation is permitted to proceed on the handheld device. The authentication credentials may be administrator defined and may in some cases be an identifier and password. The identifier and password pair is different from other identifier and password pairs that the user may use to initially access the handheld device on startup or log on.

At 130, the hard reset service proceeds to back up user data housed on the handheld device to a different location that is external from the handheld device when the security policy is successfully enforced. So, the hard reset service takes control before the operating system of the handheld device can erase the user data during the hard reset operation. Upon taking control, the hard reset service backs up the user data to a location that is independent and not affected by the impending erasure of the user data housed on the handheld device.

In an embodiment, at 131 the hard reset service identifies the different location to back up the user data as a removable memory card interfaced or inserted into the handheld device. Alternatively, the hard reset service identifies the different location as a remote storage location, which is located over a wide-area-network (WAN), such as the Internet. In this latter embodiment, the handheld device is enabled to connect to the WAN and communicate with a remote and external server to store the user data on the handheld device to the remote location.

At 140, the hard reset service passes the hard reset operation along to a kernel process of the OS that executes on the handheld device, the kernel process then proceeds to execute the hard reset on the handheld device once the hard reset service has completed the back up of the user data to the different and independent location.

Some example illustrations that utilize a Windows CE® OS for a handheld device are now presented. It is noted that other OS including Unix, Macintosh®, Linux, etc. may be used as well utilizing the same techniques discussed herein above and below.

The interrupt architecture in a Windows CE® device explains interrupts are handled by an ISR (interrupt service routine). In such an environment, the hard reset service can at least be partially implemented as a customized ISR that is registered to process on hard reset interrupts. As soon as a user tries to hard reset the device, the OS's kernel calls the registered hard reset service (ISR) to handle hard reset interrupt. The application then asks the user for a device password or Personal Identification (PIN) number, which can be decided by system administrator, if the user provides a wrong input the hard reset service returns a SYSINTR_NOP instruction to the kernel and the kernel ignores the interrupt (i.e. hard reset is not processed).

When a user provides the correct credentials (password or PIN number), the hard reset service backs up device data to a management server or storage card (as defined by administrator) and finally the hard reset operation is processed.

Windows Mobile interrupt architecture provides a mechanism to deal with interrupts. Both the original equipment manufacturer (OEM) and application developers can extend interrupt handle mechanism, however OEM has more control over interrupts.

So, whenever a hardware interrupt is generated, it causes the kernel ISR vector to be loaded onto the processor of the handheld device. The kernel then vectors to the OEM adaptation layer (OAL) ISR that has been registered for that particular interrupt. The OAL ISR then can either directly handle the interrupt or can use NKCallIntChain to walk a list of installed ISRs (these are developed by application developers; however OEM's can restrict application developer to register for a particular interrupt). Custom hard reset interrupt handler (hard reset service (customized ISR)) is registered to the OAL ISR.

The main ISR or any of the installed ISRs then performs any work and returns one of the values:

SYSINTR_NOP or SYSINTR.

SYSINTR_NOP means the interrupt is not associated with any registered ISR for a device. In such a case the kernel enables all other interrupts. It means kernel ignores this interrupt.

SYSINTR means the interrupt is associated with a known registered ISR and device. On receiving SYSINTR, the kernel re-enables all interrupts on the processor except for the identified interrupt. The kernel then signals the event that has been associated with the SYSINTR value.

Application developers can write an IST (interrupt service thread) in an application or device driver which listens for that particular event. The IST (interrupt service thread) of a driver or application is then able to run assuming that it is the highest priority thread that is ready to run. The IST communicates with the associated device and reads any necessary data from the device completing its interrupt interaction. The IST then signals its completion with a call to InterruptDone( ) with the associated SYSINTR value.

The kernel, upon receiving the InterruptDone( ) for the SYSINTR value, then re-enables the designated interrupt.

The hard reset service handles backing up user data on the handheld device in the following manner. To restrict unauthorized hard reset the hard reset service can also be partially implemented as an installable ISR which asks the user to provide credentials for hard resetting the handheld device. When the user try to hard reset the device, a hard-reset interrupt is generated causing the kernel ISR vector to load on the processor of the handheld device. The kernel ISR interacts with the hardware disabling all interrupts on processor, the kernel then vectors to the hard reset service (installed ISR). The ISR prompts a dialog with the user for a password or a secure PIN. If the user fails to provide the password within limited time duration or provides wrong password, then the ISR returns a SYSINTR_NOP value to the kernel. The kernel ignores the hard reset interrupt and re-enables all other interrupts on the processor.

If the user provides the correct password within limited time duration, the ISR returns a SYSINTR value for hard reset interrupt to the kernel, the kernel then re-enables all interrupts on the processor except for the hard reset interrupt.

Next, the kernel signals the event that has been associated with the SYSINTR value for hard reset. The hard reset service (interrupt service thread) application, which is waiting for the same event, is then signaled. The hard reset service then runs; the kernel gives highest priority to IST. The IST fetches the security policy data and then backs up all user data to a management server or storage card. After data back up, the IST invokes the hard reset and then signals its completion to kernel with a call to InterruptDone( ) and with an associated SYSINTR value.

The kernel, upon receiving the InterruptDone( ) for the SYSINTR value re-enables the designated interrupt.

The hard reset service (customized ISR) is implemented to authenticate a user on hard reset operation processing. Furthermore, the hard reset service is implemented to back up device data and trigger the hard reset operation for processing.

The administrator can restrict unauthorized hard reset of Windows® Mobile devices. The administrator can define the following in a security policy:

1) use device password and/or secure PIN (generated by Administrator) for hard reset;
2) back up data to management server or storage card; and
3) in the case of a back up to the management server, the specific management server details.

Figure 2:
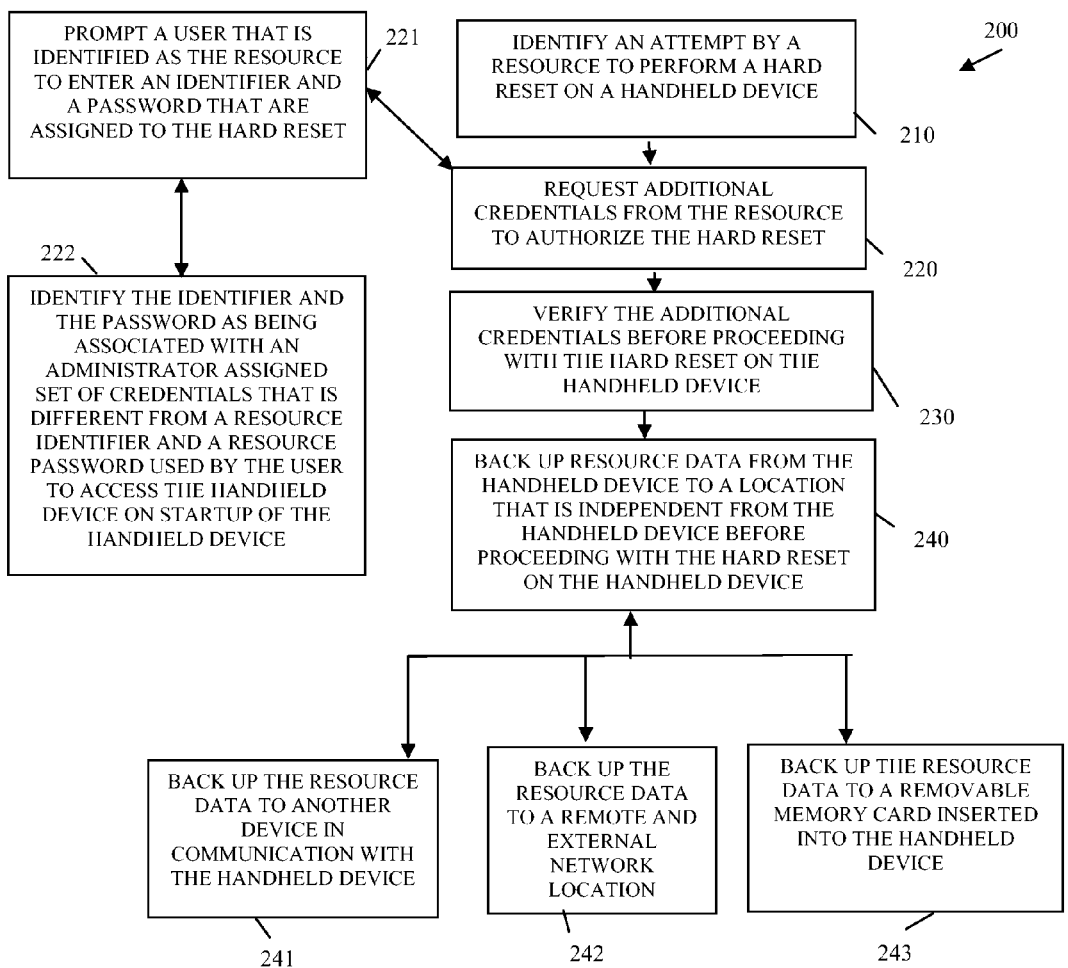
FIG. 2 is a diagram of another method for authorizing a hard reset and securing data hard on a device during a hard reset operation, according to an example embodiment.

FIG. 2 is a diagram of another method 200 for authorizing a hard reset and securing data hard on a device during a hard reset operation, according to an example embodiment. The method 200 (hereinafter "handheld security service") is implemented as instructions in a machine-accessible and readable medium. The instructions when executed by a handheld machine perform the processing depicted in the FIG. 2. The handheld security service is also operational over and processes within a network. The network may be wired, wireless, or a combination of wired and wireless.

The handheld security service represents another perspective and in some cases enhanced view of the hard reset service represented by the method 100 and discussed above with reference to the FIG. 1.

At 210, the handheld security service identifies an attempt by a resource to perform a hard reset on a handheld device. The device can be running any OS, such as but not limited to Windows CE®, Macintosh®, Unix, Linux, etc. The handheld device also includes a variety of user-defined data.

At 220, the handheld security service requests additional credentials from the resource (e.g., user or in some cases an automated application). In an embodiment, the additional credentials are different and separate from that which the user used to initially log into and use the handheld device. In another case, the credentials are the same as that which the user used to login to the handheld device but the user is affirmatively asked to manually re-enter them for authentication to process the requested hard reset operation on the handheld device.

According to an embodiment, at 221, the handheld security service prompts a user that is identified as the resource to enter an identifier and a password, which are assigned to the hard reset authentication processing. In some cases the identifier and password may be a PIN, as was discussed above with reference to the method 100 of the FIG. 1.

Moreover, in some cases at 222, the handheld security service identifies the identifier and password as being associated with an administrator assigned set of credentials, which again are different from a resource identifier and a resource password that the user used to access the handheld device on startup of the handheld device.

At 230, the handheld security service verifies the additional credentials before proceeding with the hard reset on the handheld device. So, the credentials are authenticated before any further processing associated with the hard reset of the handheld device is done.

According to an embodiment, at 240, the handheld security service backs up resource data from the handheld device to a location that is independent from the handheld device before proceeding with the hard reset processing on the handheld device. This an occur in a variety of fashions.

For example, at 241, the handheld security service backs up the resource data to another device that is in communication with the handheld device. The handheld device may be connected via a Universal Serial Bus (USB) connection to another device, such as a laptop. Alternatively, the handheld device can be communicating with another device via Bluetooth or some other wireless protocol.

In another situation, at 242, the handheld security service backs up the resource data to a remote and external network connection. In this case, the handheld device has a connection to an external network (such as the Internet or a WAN) and is in communication with a remote device to store and transfer the resource data to the remote location located over the external network connection.

In yet another case, at 243, the handheld security service backs up the resource data to a removable memory card that is inserted into the handheld device or that is in wireless communication with the handheld device.

Figure 3:
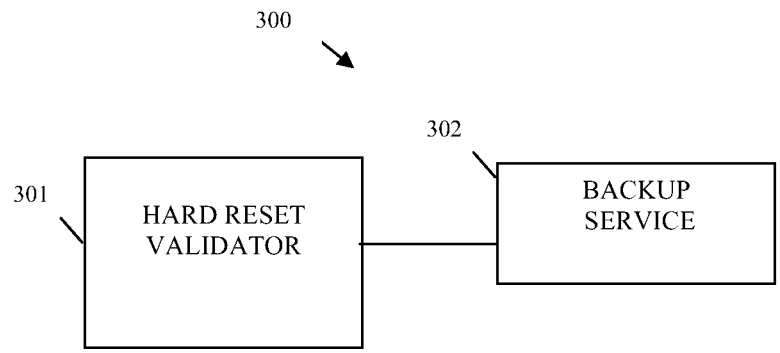
FIG. 3 is a diagram of hard reset security system, according to an example embodiment.

FIG. 3 is a diagram of hard reset security system 300, according to an example embodiment. The hard reset security system 300 is implemented as instructions on or within a computer-readable storage medium and a machine-accessible and readable medium. The instructions when executed by a handheld machine (phone, PDA, etc.) perform various aspects of the processing depicted with respect to the method 100 of the FIG. 1 and the method 200 of the FIG. 2. The hard reset security system 300 is also operational over a network and the network may be wired, wireless, or a combination of wired and wireless.

The hard reset security system 300 includes a hard reset validator 301 and a backup service 302. Each of these components and their interactions with one another will now be discussed in turn.

The hard reset validator 301 is implemented in a machine-accessible and computer-readable storage medium and processes on a handheld device. Example processing associated with the hard reset validator 301 was provided in detail above with reference to the methods 100 and 200 of the FIGS. 1 and 2, respectively.

The hard reset validator 301 ensures that additional security compliance is achieved when a hard reset is requested on the handheld device.

In an embodiment, the additional security compliance is pre-defined as a policy located in a secure area of the handheld device. The secure area is an area of the hard drive for the handheld device that cannot be modified by the user and is not subject to erasure on the successful processing of a hard reset operation.

According to an embodiment, the hard reset validator 301 interacts with a user in response to the additional security compliance to acquire an administrator-defined set of credentials (identifier and password or PIN). The hard reset validator 301 then validates the set of credentials before permitting the hard reset operation to proceed on the handheld device.

In still another situation, the hard reset validator 301 is triggered in response to a notification from a kernel process of an OS for the handheld device. The kernel process receives the hard reset as an OS interrupt.

When the additional security compliance is achieved, the hard reset validator 301 contacts the backup service 302.

The backup service 302 is implemented in a machine-accessible and computer-readable storage medium and is to process on the handheld device. Example aspects of the backup service 302 was also described in detail above with reference to the methods 100 and 200 of the FIGS. 1 and 2, respectively.

The backup service 302 backs up user data located on the handheld device to a different location that is external and independent from the handheld device before the hard reset is processed on the handheld device.

According to an embodiment, the backup service 302 uses a backup policy to identify types of the user data to backup and to identify the different location for storing the user data. In other words, a policy that is dynamically evaluated by the backup service 302 can be used to selectively backup the user data from the handheld device to an identified location based on types associated with the user data. So, emails can be designated as a type as can word processing documents, the policy may state backup the emails but not word processing documents or vice versa. The policy can also say back up all types of data on the handheld device.

In an embodiment, the backup service 302 storage the user data to one or more of the following: a removable media card that is interfaced to the handheld device, another device that is interfaced to the handheld device, a network storage located over a WAN connection from the handheld device, etc.

Figure 4:
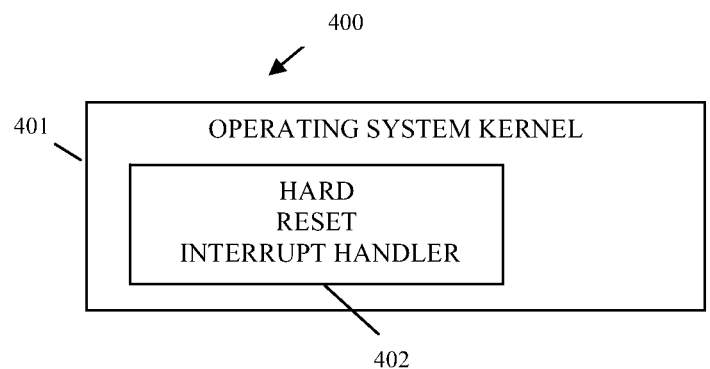
FIG. 4 is a diagram of another hard reset security system, according to an example embodiment.

FIG. 4 is a diagram of another hard reset security system 400, according to an example embodiment. The hard reset security system 400 is implemented as instructions on or within a machine-accessible and computer-readable storage medium. The instructions when executed by a handheld machine (such as a phone, PDA, gaming device, etc.) perform various aspects of the processing depicted with respect to the methods 100 and 200 of the FIGS. 1 and 2, respectively, and processing associated with the system 300 of the FIG. 3. The hard reset security system 400 is also operational over a network and the network may be wired, wireless, or a combination of wired and wireless.

The hard reset security system 400 includes an operating system (OS) kernel 401 and a hard reset interrupt handler 402. Each of these components and their interactions with one another will now be discussed in turn.

The OS kernel 401 is implemented in a machine-accessible and computer-readable storage medium that processes on the handheld device. Some example OS's can include Windows®, Macintosh®, Unix, Linux, etc.

The hard reset interrupt handler 402 is implemented in a machine-accessible and computer-readable storage medium and processes within the OS kernel 401 of the handheld device. Example processing associated with the hard reset interrupt handler 402 was described in detail above with reference to the methods 100 and 200 of the FIGS. 1 and 2, respectively, and with respect to the system 300 of the FIG. 3.

During operation of the system 400, a kernel process of the OS kernel 401 notifies the hard reset interrupt handler 402 when a hard reset operation is issued on the handheld device and waits for further instruction from the hard reset interrupt handler 402 after that notification. The hard reset interrupt handler 402 performs a security compliance check to ensure that the hard reset operation is permissible and when it is notifies the kernel process to proceed with the hard reset operation and when it is not notifies the kernel process to ignore the hard reset operation.

According to an embodiment, the security compliance check indicates that the hard reset operation is permissible and before the hard reset interrupt handler 402 notifies the kernel process, the hard rest interrupt handler 402 backs up data stored on the handheld device. The data can be backed up to a variety of devices and locations that can be configured as a processing parameter to the system or as a policy.

So, in one case the data is backed up to a location that is independent and separate from the handheld device. In another case, the data is backed up to another device or external network location.

In an embodiment, the hard reset interrupt handler 402 prompts a user of the handheld device for an additional identifier and password in response to the additional security compliance check. So, re-authentication can be requested when the hard reset operation is requested.

It is now understood how handheld hard resets can include additional and configurable security compliance and how data can be backed up before any hard reset is actually processed on the handheld device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for processing a hard reset operation on a handheld device, comprising:
   receiving, via an operating system kernel, the hard reset operation on the handheld device and interacting with hardware of the handheld device to disable all interrupts;
   enforcing a configured security policy before permitting the hard reset operation to proceed, wherein enforcing further includes prompting a user of the handheld device to enter authentication credentials defined by the configured security policy before proceeding further with the hard reset operation on the handheld device, the authentication credentials are different from other authentication credentials of the user for access to the handheld device or log on to the handheld device, and the authentication credentials are a secure Personal Identification Number (PIN) that has to be provided within a limited time duration by the user otherwise the interrupts are re-enabled; and
   backing up user data held on the handheld device to a different location that is external from the handheld device when the security policy is successfully enforced.

2. The method of claim 1 further comprising, passing the hard reset operation along to a kernel of an operating system to be processed on the handheld device once the user data is backed up.

3. The method of claim 1, wherein receiving further includes receiving, by an application, a notice from a kernel of an operating system of the handheld device that the hard reset operation has been requested on the handheld device.

4. The method of claim 1, wherein enforcing further includes accessing the configured security policy on the handheld device from a location that is not subject to the hard reset operation.

5. The method of claim 1, wherein backing up further includes identifying the location as a removable memory card interfaced to the handheld device or as a remote storage location located over a wide-area network that the handheld device is in communication with.

6. A machine-implemented method, comprising:
identifying an attempt by a resource to perform a hard reset on a handheld device and disabling all interrupts on the handheld device;
requesting additional credentials from the resource to authorize the hard reset; and
verifying the additional credentials before proceeding with the hard reset on the handheld device, the additional credentials are different from other credentials of the resource that the resource has for log on or access to the handheld device, and the authentication credentials are a secure Personal Identification Number (PIN) that has to be provided within a limited time duration by the resource otherwise the interrupts are re-enabled.

7. The method of claim 6 further comprising, backing up resource data from the handheld device to a location that is independent from the handheld device before proceeding with the hard reset on the handheld device.

8. The method of claim 7, wherein backing up further includes backing up the resource data to a remote and external network location.

9. The method of claim 7, wherein backing up further includes backing up the resource data to a removable memory card inserted into the handheld device.

10. The method of claim 6, wherein requesting further includes prompting a user that is identified as the resource to enter an identifier and a password that are assigned to the hard reset.

11. The method of claim 10, wherein prompting further includes identifying the identifier and the password as being associated with an administrator assigned set of credentials that is different from a resource identifier and a resource password used by the user to access the handheld device on startup of the handheld device.

12. A machine-implemented system, comprising:
a hard reset validator implemented in a machine-accessible and readable medium that process on a handheld device; and
a backup service implemented in a machine-accessible and readable medium and to process on the handheld device;
wherein the hard reset validator ensures that additional security compliance is achieved when a hard reset is requested on the handheld device by disabling all interrupts on the handheld device, and wherein when the additional security compliance is achieved the backup service backs up user data located on the handheld device to a different location that is external and independent from the handheld device before the hard reset is processed on the handheld device, the additional security compliance ensures that a user provides different credentials from what the user has to logging into or accessing the handheld device, and the different credentials are a secure Personal Identification Number (PIN) that has to be provided within a limited time duration by the user otherwise the interrupts are re-enabled.

13. The system of claim 12, wherein the additional security compliance is pre-defined as a policy located in a secure area of the handheld device.

14. The system of claim 12, wherein hard reset validator interacts with a user in response to the additional security compliance to acquire an administrator-defined set of credentials that the hard reset validator validates before permitting the hard reset to proceed on the handheld device.

15. The system of claim 12, wherein the hard reset validator is triggered in response to a notification from a kernel process of an operating system for the handheld device that receives the hard reset as an OS interrupt.

16. The system of claim 12, wherein the backup service uses a backup policy to identify types of the user data to backup and to identify the different location for storing the user data.

17. The system of claim 12, wherein when the backup service stores the user data to one or more of the following: a removable media card interfaced to the handheld device, another device interfaced to the handheld device, and a network storage location located over a wide-area network connection from the handheld device.

18. A machine-implemented system, comprising:
an operating system (OS) kernel implemented in a machine-accessible and readable medium and that processes on a handheld device; and
a hard reset interrupt handler implemented in a machine-accessible and readable medium and to process within the OS kernel of the handheld device;
wherein a kernel process of the OS kernel notifies the hard reset interrupt handler when a hard reset operation is issued on the handheld device and waits for further instruction from the hard reset interrupt handler after notification and disables all interrupts, and wherein the hard reset interrupt handler performs a security compliance check to ensure the hard reset operation is permissible and when it is notifies the kernel process to proceed with the hard reset operation and when it is not notifies the kernel process to ignore the hard reset operation, wherein the hard reset interrupt handler prompts a user of the handheld device for an additional secure Personal identification Number (PIN) in response to the additional security compliance check that are different from an identifier and password of the user to login or access the handheld device, and the secure PIN has to be provided within a limited time duration by the user otherwise the interrupts are re-enabled.

19. The system of claim 18, wherein when the security compliance check indicates that the hard reset operation is permissible and before the hard reset interrupt handler notifies the kernel process, the hard reset interrupt handler backs up data stored on the handheld device.

20. The system of claim 19, wherein the data is backed up to a location that is independent and separate from the handheld device.

* * * * *